United States Patent Office 3,174,802
Patented Mar. 23, 1965

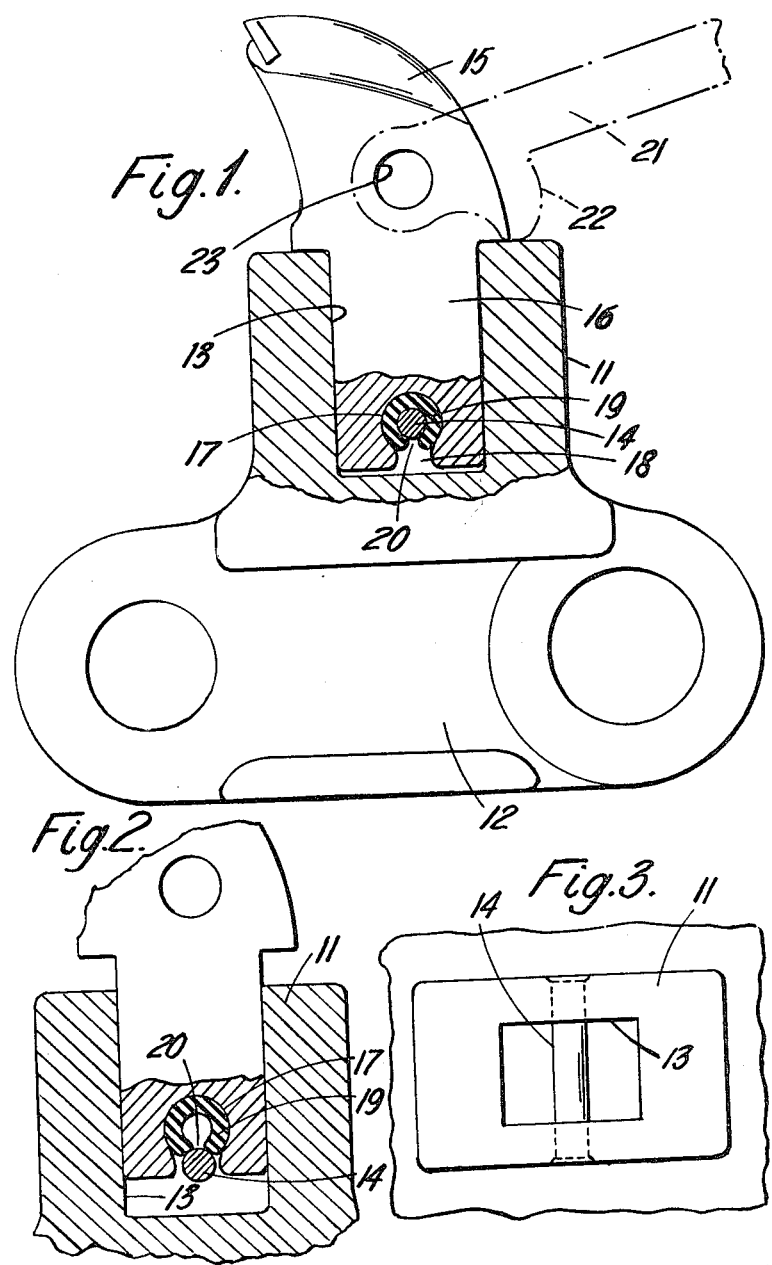

3,174,802
RESILIENTLY HELD COAL-CUTTER PICKS
Sidney Ernest Proctor, High Wycombe, England, assignor to Austin Hoy and Company Limited, Buckinghamshire, England
Filed June 6, 1963, Ser. No. 286,054
6 Claims. (Cl. 299—92)

The invention relates to coal-cutter picks, and more particularly to means for retaining a coal-cutter pick in a pick-box.

According to one aspect of the invention a coal-cutter pick has a recess communicating with the base of the shank of the pick by way of a narrow neck and an insert of resilient material such as rubber in the recess with a neck narrower than the neck of the recess, so that on insertion of the pick into a pick-box having a pick-holding member rigidly fixed therein, the pick-holding member is caused to enter the recess by deforming the insert, and is held in the recess by the insert in such a way that more force is needed for extraction than for insertion.

According to another aspect of the invention means for holding a coal-cutter pick in a pick-box comprise a recess at the base of the shank of the pick, a narrow neck communicating the recess with the base, an insert of resilent material such as rubber in the recess with a neck narrower than the neck of the recess and associated therewith and a pick-holding member rigidly fixed in the pick-box to engage the recess in the pick and hold the pick in the pick-box, so that a greater force is required for extraction of the pick from the pick-box than is required for insertion.

Preferably the recess and the neck thereof extend across the whole width of the shank of the pick; preferably the pick-holding member is a bar extending across the pick-box and located in both sides thereof; the bar may be welded or it may be riveted into the pick-box.

Preferably the recess and the pick-holding member are in the mid-position between the front and rear of the pick-box; this results in a pick which is reversible (i.e. a pick which can be fitted into the pick-box in either of two opposite directions).

Preferably the insert is shaped as an inverted U with thicker portions at the ends of the U. Thus the pick-holding member enters the recess by compressing the ends of the insert away from the neck of the recess but when the pick-holding member is fully inserted the ends of the insert again take up a position near the neck of the recess; the result is that when a force is applied to extract the pick from the pick-box (and so the pick-holding member from the recess) the ends of the insert are deformed towards the neck of the recess and so afford a constriction to extraction of the pick.

One construction of a pick and pick-box in accordance with the invention will now be described by way of example.

In the accompanying drawing:

FIGURE 1 is a side elevation of a link of a coal-cutter chain with parts of the pick-box and pick relating to the securing of the latter broken away to show the internal construction;

FIGURE 2 is a detail showing the parts in a different position; and

FIGURE 3 is a plan of the pick-box.

As shown in FIGURE 1, a pick-box 11 on a link 12 of a cutter chain has a conventional broached rectangular pick-hole 13 wtih its greater measurement along the length of the chain. Near the bottom of the pick-hole 13 a pick-holding member 14 in the form of a circular metal cross-bar is fixed across the pick-hole parallel to and mid-way between the front and rear faces of the pick-hole.

A coal-cutter pick 15 has a rectanagular shank 16 which is a sliding fit in the pick-hole 13. The length of the shank 16 is somewhat more than the depth at which the bar 14 is fixed across the pick-box. Near the lower end of the shank, at a depth corresponding to the depth of the bar 14, a circular recess 17 extends across the width of the shank mid-way between the front and rear faces thereof; this recess 17 is approximately twice the diameter of the metal bar 14. Part of the shank between the circular recess and the base of the pick is cut away to provide a neck-opening 18 which communicates with the base; the neck is just large enough to allow the bar to pass through it freely.

A rubber inverted U shaped liner 19 with the ends of the U thickened to afford a narrow neck-opening 20 in the insert is located in the recess with its neck-opening in line with the neck-opening 18 of the recess.

The pick may be inserted and located in the pick-hole simply by application of manual pressure. The parts are initially in the position shown in FIGURE 2 and as the pick is pressed down the bar 14 enters the neck 18 of the recess and exerts pressure on the ends of the liner 19; these ends are pushed up relatively to the pick into the middle of the recess 17 as the bar enters the recess. As the bar enters further into the recess it pushes the ends of the liner 19 apart and they spring back and take up their original position near the neck 18 of the recess; at this stage the bar has passed the ends of the liner and is in the centre of the recess as shown in FIGURE 1. Thus the pick is fully inserted in the pick-hole.

If in the course of use the forces on the cutting part of the pick 15 tend to draw it out of the pick-box 11 the shank 16 is urged up relatively to the bar 14 and the force on bar 14 urges the ends of the liner 19 downwardly relatively to the shank 16. The greater the applied force, up to a certain point, the further are the ends of the liner 19 urged into the neck 18 of the recess. Thus a wedging effect is produced, for the neck is too small to pass both the bar and the liner, and the tool is firmly held in place.

Means may be provided on the pick head for engagement of a lever to extract the pick. Such a lever is shown in FIGURE 1 in chain lines at 21. The lever 21 has a heel 22 to engage the upper surface of the pick-box and carries a pin in its side to enter a hole 23 in the head of the pick by which means the pick can be levered up. The application of sufficient force either deforms or shears the liner 19 sufficiently for the pick to be extracted.

It will be noted that the symmetrical positioning of the bar and recess permit a pick to be inserted in either direction so that a coal-cutter chain may cut in either direction.

In a pick and pick-box as described above there is no part of the pick-box which is damaged by instertion and removal of a pick and no mechanical parts which can fail, so that such pick-boxes have a long trouble-free life. Although the liner 19 may well be damaged by removing a pick, as picks must often be re-conditioned or replaced little inconvenience is caused.

I claim:

1. A coal-cutter pick having a recess communicating with the base of the shank of the pick by way of an opening narrower than the said recess, said recess extending along the shank parallel to the sides of the pick, and a liner of resilient rubber inserted in the recess, said liner being hollow, with an opening in its side narrower than the opening in the shank of the pick and arranged in line therewith.

2. Means for holding a coal-cutter pick in a pick-box comprising in combiantion a pick-box having a pick-shank-receiving opening, a pick having a shank fitted in the opening, a transverse recess in said shank, said recess communicating with the base of the shank by an opening narrower than the width of the recess, a liner of resilient rubber in the recess with an opening in its side in line with and narrower than the opening in the shank of the recess, and a pick-holding member rigidly fixed in the pick-box, said pick holding member extending across said opening in the pick-box and snugly received and held in said liner, the width of the pick holding member being narrower than the opening in the shank and wider than the opening in the liner.

3. Means for holding a coal-cutter pick in a pick-box as claimed in claim 2, wherein the recess and the opening in the shank of the pick extend across the whole width of the shank of the pick.

4. Means for holding a coal-cutter pick in a pick-box as claimed in claim 3, wherein the pick-holding member is a bar extending across the pick-box and located in both sides thereof.

5. Means for holding a coal-cutter pick in a pick-box as claimed in claim 2 wherein the recess and the pick-holding member are in mid-position between the front and rear of the pick-box.

6. Means for holding a coal-cutter pick in a pick-box as claimed in claim 2, wherein the liner, as viewed in cross-section, is shaped as an inverted U with thicker portions at the ends of the U.

References Cited by the Examiner
UNITED STATES PATENTS

| | | | |
|---|---|---|---|
| 80,565 | 8/68 | Raymond | 279—97 |
| 1,962,589 | 6/34 | Harrington | 279—97 |
| 2,965,365 | 12/60 | Krekeler. | |

BENJAMIN HERSH, *Primary Examiner.*